US012450030B2

United States Patent
Lesso et al.

(10) Patent No.: US 12,450,030 B2
(45) Date of Patent: Oct. 21, 2025

(54) CIRCUITRY FOR PERFORMING A MULTIPLY-ACCUMULATE OPERATION

(71) Applicant: Cirrus Logic International Semiconductor Ltd., Edinburgh (GB)

(72) Inventors: John P. Lesso, Edinburgh (GB); John L. Melanson, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 1080 days.

(21) Appl. No.: 17/388,285

(22) Filed: Jul. 29, 2021

(65) Prior Publication Data

US 2023/0046369 A1 Feb. 16, 2023

(51) Int. Cl.
*G06F 7/544* (2006.01)
*G06F 17/15* (2006.01)
*H03M 7/26* (2006.01)

(52) U.S. Cl.
CPC ............ *G06F 7/5443* (2013.01); *G06F 17/15* (2013.01); *H03M 7/26* (2013.01)

(58) Field of Classification Search
CPC .......... H03K 3/017; H03M 1/04; H03M 7/26; G06F 7/607; G06F 7/62; G06F 7/68; G06F 7/70
See application file for complete search history.

(56) References Cited

PUBLICATIONS

H. Ichihara, T. Sugino, S. Ishii, T. Iwagaki and T. Inoue, "Compact and accurate digital filters based on stochastic computing," in IEEE Transactions on Emerging Topics in Computing, vol. 7, No. 1, pp. 31-43, Jan. 1-Mar. 2019 (Year: 2019).*

K. Zhong, M. Yang and W. Qian, "Optimizing Stochastic Computing-Based FIR Filters," 2018 IEEE 23rd International Conference on Digital Signal Processing (DSP), Shanghai, China, 2018, pp. 1-5 (Year: 2018).*

Y.-N. Chang and K. K. Parhi, "Architecture for digital filters using stochastic computing", International Conference on Acoustics Speech and Signal Processing, pp. 2697-2701, 2013 (Year: 2013).*

A. Alaghi et al., "The Promise and Challenge of Stochastic Computing", IEEE TCAD, vol. 37, No. 8, pp. 1515-1531, 2018 (Year: 2018).*

Abdellatef, Hamdan, et al. "Low-area and accurate inner product and digital filters based on stochastic computing." Signal processing 183 (2021) (Year: 2021).*

(Continued)

*Primary Examiner* — Matthew D Sandifer
(74) *Attorney, Agent, or Firm* — Jackson Walker L.L.P.

(57) ABSTRACT

The present disclosure relates to circuitry for performing a multiply-accumulate (MAC) operation. The circuitry comprises a first multiplexer having a plurality of inputs for receiving a plurality of unary-coded input signals representing operands of the MAC operation and an output for outputting a multiplexer output signal representing a result of the MAC operation and a first vector quantizer configured to receive a plurality of weighting signals, each representing a proportion of a computation time period for which a respective one of the unary-coded input signals should be selected by the multiplexer and to output a first selector signal to the multiplexer to cause the multiplexer to select each of the input signals in accordance with the plurality of weighting signals.

20 Claims, 16 Drawing Sheets

(56) References Cited

PUBLICATIONS

Li, Ji, et al. "Towards acceleration of deep convolutional neural networks using stochastic computing." 2017 22nd Asia and South Pacific Design Automation Conference (ASP-DAC). IEEE, 2017 (Year: 2017).*

Partial International Search and Provisional Opinion of the International Searching Authority, International Application No. PCT/GB2022/051592, mailed Sep. 12, 2022.

Weller, Dennis D. et al.: "Printed Stochastic Computing Neural Networks," 2021 Design, Automation & Test in Europe Conference and Exhibition, EDAA, Feb. 1, 2021, pp. 914-919.

Sim, Hyeonuk et al.: "Cost-Effective Stochastic MAC Circuits for Deep Neural Networks," Neural Networks, Elsevier Science Publishers, Barking, GB, vol. 117, May 20, 2019, pp. 152-162.

Khadem, Alireza, "Design Challenges of Neural Network Acceleration Using Stochastic Computing," ARVIX,org, Cornell University Library, 201 Olin Library Cornell University, Ithaca, NY, Jun. 8, 2020, Section II, IV, V.

* cited by examiner

CIRCUITRY FOR PERFORMING A MULTIPLY-ACCUMULATE OPERATION

FIELD OF THE INVENTION

The present disclosure relates to circuitry for performing a multiply-accumulate operation in stochastic computing.

BACKGROUND

In stochastic computing, computation is performed on bitstreams representing the operands to a computing operation. The bitstreams may be random or pseudo-random, and the value of the operand is represented by the probability of observing a one in that bitstream. For example, for a bitstream that is eight bits long and contains four ones and four zeros distributed randomly or pseudo-randomly throughout the bitstream, the probability of observing a one at a randomly selected bit position in the bitstream is $4/8=1/2$, and so the value represented by the bitstream is $1/2$.

Stochastic computing permits the use of simple logic to perform complex operations. For example, a multiply operation can be performed with a single AND gate performing a bitwise AND operation on input bitstreams representing the operands to the multiply operation. In the example shown in FIG. 1, to perform the multiplication operation $1/2 \times 3/4$, the first operand ($1/2$) represented by the bitstream 01101010 (i.e. an 8 bit bitstream containing four ones) is input to a first input of a logic AND gate, and the second operand ($3/4$) represented by the bitstream 1011011 (i.e. an 8 bit bitstream containing six ones) is input to a second input of the logic AND gate. The 8 bit bitstream output by the AND gate is 00101001, i.e. has three ones, and thus the probability of observing a one at a randomly selected bit position in the output bitstream is $3/8$, which is the correct result of the operation $1/2 \times 3/4$.

Thus, provided that there is no correlation between the operands, a multiplication operation can be performed simply by performing a bitwise AND operation, with the accuracy of the result being dependent upon the number of bits examined at the output of the AND gate.

Modern computing systems typically make extensive use of matrix multiplication operations, which are typically implemented using multiply-accumulate (MAC) operations. While multiplication is simple in stochastic computing, a multiply accumulate operation is more complicated, as each product (i.e. the result of each individual multiplication operation) must be accumulated to reach the final result of the MAC operation.

SUMMARY

The present disclosure relates to circuitry for performing a multiply-accumulate (MAC) operation, in which operands of the MAC operation are represented by unary coded bitstreams. Multiplexer circuitry receives the bitstreams representing the operands and selects each bitstream for output by the multiplexer circuitry for a proportion of a total computation time period. Over the computation period the multiplexer thus generates and outputs a time division multiplexed signal based on the bitstreams input to the multiplexer. The proportion of the total computation time period for which each bitstream is selected for output by the multiplexer circuitry is determined by a vector quantizer based on weighting signals received by the vector quantizer.

According to a first aspect, the invention provides circuitry for performing a multiply-accumulate (MAC) operation, the circuitry comprising:
  a first multiplexer having a plurality of inputs for receiving a plurality of unary-coded input signals representing operands of the MAC operation and an output for outputting a multiplexer output signal representing a result of the MAC operation; and
  a first vector quantizer configured to receive a plurality of weighting signals, each representing a proportion of a computation time period for which a respective one of the unary-coded input signals should be selected by the multiplexer and to output a first selector signal to the multiplexer to cause the multiplexer to select each of the input signals in accordance with the plurality of weighting signals.

The circuitry may further comprise an integrator for integrating the multiplexer output signal over a period of time.

The circuitry may further comprise an encoder for encoding a signal output by the integrator into a unary coded output signal.

The circuitry may further comprise a consecutive edge modulator (CEM) configured to encode the multiplexer output signal into a consecutive edge modulated signal.

The CEM may comprise:
  a first counter configured to generate a first pulse width modulated signal based on the number of high bits in a first frame of the multiplexer output signal;
  a second counter configured to generate a second pulse width modulated signal based on the number of high bits in a second frame of the multiplexer output signal; and
  a selector configured to select the first pulse width modulated signal as a first frame of a CEM output signal and to invert the second pulse width modulated signal in time to generate a second frame of the CEM output signal.

The second frame of the multiplexer output signal may immediately follow the first frame of the multiplexer output signal, and the second frame of the CEM output signal may immediately follow the first frame of the CEM output signal.

The first frame of the multiplexer output signal may be an odd-numbered frame of the multiplexer output signal and the second frame of the multiplexer output signal may be an even-numbered frame of the multiplexer output signal.

The first vector quantizer may comprise:
  a plurality of integrators, each configured to receive a respective weighting signal; and
  a processing unit configured to, in each cycle of a computation period of the circuitry:
  determine a maximum among the outputs of the plurality of integrators;
  output a control signal to the first multiplexer to cause the first multiplexer to select an input corresponding to the weighting signal received by the integrator whose output is maximum; and
  reset the integrator whose output is maximum.

Resetting the integrator may comprise resetting the output of the integrator to 0 or to a random value.

The first vector quantizer may comprises a tree-based modulator, for example.

The circuitry may further comprise a second multiplexer configured to receive a second selector signal from the first vector quantizer.

The circuitry may further comprise a second multiplexer and a second vector quantizer, the second multiplexer being configured to receive a second selector signal from the second vector quantizer.

Each of the plurality of unary-coded input signals may be encoded according to a common encoding scheme.

At least one of the plurality of unary-encoded input signals may be encoded according to a different encoding scheme than at least one other of the plurality of unary-encoded input signals.

According to a second aspect, the invention provides convolutional Neural Network (CNN) circuitry comprising MAC circuitry according to the first aspect.

According to a third aspect, the invention provides stochastic to consecutive edge modulation (CEM) converter comprising:
  a first counter configured to generate a first pulse width modulated signal based on the number of high bits in a first frame of a received stochastic signal;
  a second counter configured to generate a second pulse width modulated signal based on the number of high bits in a second frame of the received stochastic signal; and
  a selector configured to select the first pulse width modulated signal as a first frame of a CEM output signal and to invert the second pulse width modulated signal in time to generate a second frame of the CEM output signal.

According to a fourth aspect, the invention provides an integrated circuit comprising the circuitry of first, second or third aspect.

According to a fifth aspect, the invention provides a device comprising the circuitry of the first, second or third aspect.

The device may comprise a portable device, a battery powered device, a mobile telephone, a tablet or laptop computer, a smart speaker, an accessory device, a headset device, smart glasses, headphones, earphones or earbuds.

According to a sixth aspect, the invention provides circuitry for performing a multiply-accumulate (MAC) operation, the circuitry comprising multiplexer circuitry configured to output a time division multiplexed output signal comprising portions of a plurality of unary coded multiplexer input signals selected according to a control signal received by the multiplexer circuitry from vector quantizer circuitry.

According to a seventh aspect, the invention provides circuitry for performing a convolution operation between a kernel and a set of data, the circuitry comprising:
  vector quantizer circuitry configured to receive one or more input signals representing the kernel;
  first multiplexer circuitry configured to receive a first plurality of unary coded input signals representing a first subset of the data; and
  second multiplexer circuitry configured to receive a second plurality of unary coded input signals representing a second subset of the data,
  wherein the vector quantizer circuitry is configured to:
    output a first selector signal to the first multiplexer circuitry to cause the first multiplexer circuitry to select each of the first plurality of unary coded input signals for a respective proportion of a computation period, wherein the proportion of the computation period for which each of the first plurality of unary coded input signals is selected is based on the kernel; and
    output a second selector signal to the first multiplexer circuitry to cause the first multiplexer circuitry to select each of the second plurality of unary coded input signals for a respective proportion of the computation period, wherein the proportion of the computation period for which each of the second plurality of unary coded input signals is selected is based on the kernel.

According to an eighth aspect, the invention provides circuitry for performing a mean pooling function for a plurality of unary coded data signals, the circuitry comprising:
  multiplexer circuitry configured to receive the plurality of unary coded data signals; and
  vector quantizer circuitry configured to output a selection signal to cause the multiplexer circuitry to select each of the plurality of input signals for an equal proportion of a computation period.

BRIEF DESCRIPTION OF THE DRAWINGS

Embodiments of the invention will now be described, strictly by way of example only, with reference to the accompanying drawings, of which.

DETAILED DESCRIPTION

Figure 1:
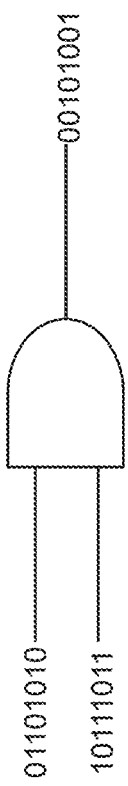
FIG. 1 is a schematic diagram illustrating the use of stochastic computing techniques to perform a multiplication operation using a logical AND operation.
Figure 2:
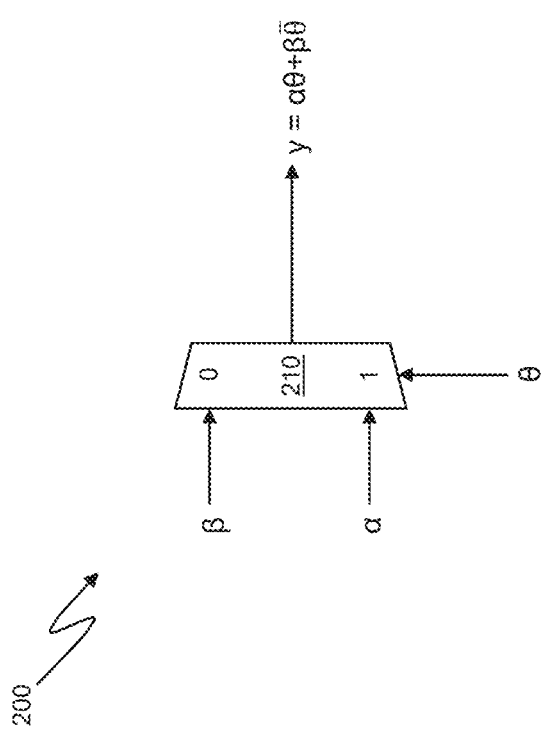
FIG. 2 is a schematic diagram illustrating one approach to performing a multiply-accumulate (MAC) operation.

An approach to performing a MAC operation is illustrated generally at 200 in FIG. 2, and uses a multiplexer 210 having first and second inputs for receiving first and second unary coded bitstreams $\alpha$, $\beta$ and a selector signal $\theta$, which is a unary coded bitstream representing a random number between 0 and 1. The complement of the selector signal $\theta$ is defined as $\bar{\theta}=1-\theta$. In some examples, the selector signal $\theta$ and the first and second unary coded bitstreams $\alpha$, $\beta$ may be synchronised to a common clock signal (not shown in FIG. 2), in which case the behaviour of the multiplexer is well defined. In examples where there is no common clock signal, the selector signal $\theta$ and the first and second unary coded bitstreams $\alpha$, $\beta$ may be plesiochronous, in the sense that they are approximately but not instantaneously frequency-aligned. In such examples, this approximate frequency alignment may be considered an extra source of noise.

In each clock period of the common clock signal, the multiplexer 210 selects and outputs the value (logic 0 or logic 1) of a current bit of the unary coded bitstream $\alpha$ at its first input when a current bit of the selector bitstream $\theta$ is at logic 1. Thus, as shown in Table 1 below, when the current bit of both the first unary coded bitstream $\alpha$ and the selector bitstreams $\theta$ are at logic 1, the output y of the multiplexer 210 is also logic 1. Otherwise the output y is logic 0. Accordingly the multiplexer 210 performs a bitwise logic AND operation on the first unary coded signal $\alpha$ and the selector signal $\theta$. As explained above, this is equivalent to a multiplication of the first unary coded signal $\alpha$ and the selector signal $\theta$.

TABLE 1

| $\alpha$ | $\theta$ | output y |
|---|---|---|
| 0 | 0 | 0 |
| 0 | 1 | 0 |
| 1 | 0 | 0 |
| 1 | 1 | 1 |

The multiplexer 210 is configured to select and output a value of the current bit of the second unary coded bitstream $\beta$ at the second input when the current bit of the selector bitstream $\theta$ is at logic 0 (and thus the complement $\bar{\theta}$ of the selector bitstream $\theta$ is at logic 1). Thus, as shown in Table 2 below, when the current bit of both the second unary coded bitstream $\beta$ and the complement $\bar{\theta}$ of the selector bitstream $\theta$ are at logic 1, the output y of the multiplexer 210 is also logic 1. Otherwise the output y is logic 0. Accordingly the multiplexer 210 performs a bitwise logic AND operation on the second unary coded bitstream $\beta$ and the complement $\bar{\theta}$ of the selector bitstream $\theta$. As explained above, this is equivalent to a multiplication of the second unary coded bitstream $\beta$ and the complement $\bar{\theta}$ of the selector bitstream $\theta$.

TABLE 2

| $\beta$ | $\bar{\theta}$ | output y |
|---|---|---|
| 0 | 0 | 0 |
| 0 | 1 | 0 |
| 1 | 0 | 0 |
| 1 | 1 | 1 |

As the selector bitstream $\theta$ and its complement $\bar{\theta}$ cannot (by definition) take the same value at any given time, the multiplexer 210 effectively acts as an AND gate for the first unary coded bitstream $\alpha$ and the selector bitstream $\theta$ for a first proportion of a computation period, and acts as an AND gate for the second unary coded bitstream $\beta$ and the complement $\bar{\theta}$ of the selector bitstream $\theta$ for a second proportion of the computation period.

Thus over the whole of a computation period (comprising, for example, a number of cycles of the common clock signal that is equal to the length of the input bitstreams) the output y will be a combination of the result of a first logic AND operation between the first unary coded bitstream $\alpha$ and the selector bitstream $\theta$ and the result of a second logic AND operation between the second unary coded bitstream $\beta$ and the complement $\bar{\theta}$ of the selector bitstream $\theta$, i.e.:

$$y=\alpha\theta+\beta\bar{\theta}.$$

As will be appreciated, this represents a MAC operation, as the result of the second multiplication operation $\beta\bar{\theta}$ is accumulated with the result of the first multiplication operation $\alpha\theta$.

Under this approach it is possible for the operands represented by the first and second unary bitstreams $\alpha$, $\beta$ to be correlated, as the output y will be correct if there is no correlation between either $\alpha$ or $\beta$ and $\theta$, provided that the durations of the first and second proportions of the computation period are correct.

Figure 3:
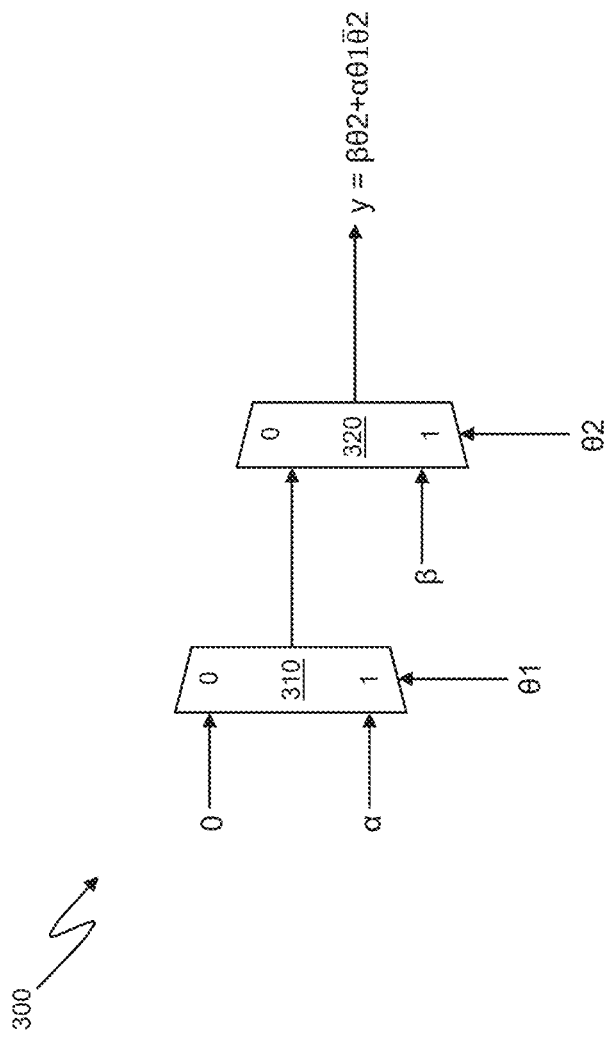
FIG. 3 is a schematic diagram illustrating a further approach to performing a MAC operation.

FIG. 3 is a schematic representation of a further approach to performing a MAC operation. As shown generally at 300, in this approach first and second multiplexers 310, 320 are daisy-chained together, with an output of the first multiplexer 310 connected to an input of the second multiplexer.

A first input of the first multiplexer 310 receives a first unary coded bitstream signal $\alpha$. A second input of the first multiplexer 310 receives a constant logic 0 signal. A first selector signal $\theta 1$ in the form of a unary coded bitstream is received at a control input of the first multiplexer 310.

A first input of the second multiplexer 320 receives a second unary coded bitstream signal $\beta$. A second input of the second multiplexer 320 is coupled to the output of the first multiplexer 320, and a second selector signal $\theta 2$, also in the form of a unary coded bitstream, is received at a control input of the second multiplexer 320. The first and second signals $\alpha$, $\beta$ and the first and second selector signals $\theta 1$, $\theta 2$ are synchronised to a common clock signal.

Thus, the output y of the chained multiplexers 310, 320 over a whole computation period can be expressed as:
  $y=\beta\theta 2+\alpha\theta 1\bar{\theta}2$, where $\bar{\theta}2$ is the complement of the second selector signal $\theta 2$.

Again, the first and second unary coded signals $\alpha$, $\beta$ can be correlated without adversely affecting the accuracy of the result of the computation, provided that there is no correlation between either $\alpha$ or $\beta$ and $\theta 1$ or $\theta 2$, and that the durations of the first and second proportions of the computation period are correct.

In order to perform the calculation $$y = \frac{\alpha w_\alpha + \beta w_\beta}{2}$$

(where $w_\alpha$ and $w_\beta$ are weightings to be applied to the variables $\alpha$ and $\beta$ respectively) using the arrangement shown in FIG. 3, the correct values $\theta 1$ and $\theta 2$ can be calculated as follows:

$$\beta\theta 2 + \alpha\theta 1\bar{\theta}2 = \frac{\alpha w_\alpha + \beta w_\beta}{2},$$

-continued so:

$$\theta 2 = \frac{w_\beta}{2} \text{ and } \theta 1 = \frac{w_\alpha}{2\overline{\theta}2}$$

Figure 4:
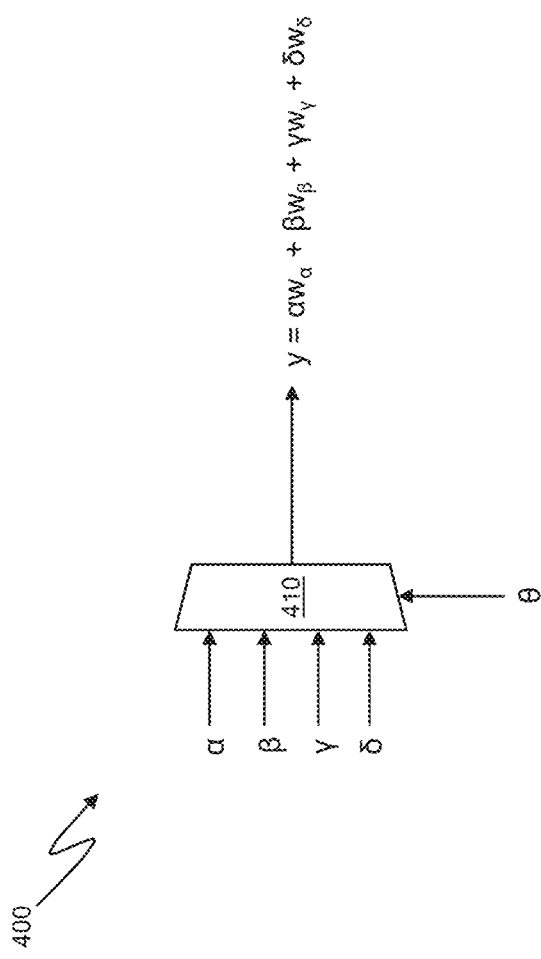
FIG. 4 is a schematic diagram illustrating a further approach to performing a MAC operation.

The approach illustrated in FIG. 3 can be improved by using a multiple input multiplexer, as shown generally at 400 in FIG. 4.

In the implementation shown generally at 400 in FIG. 4 a multiple input multiplexer 410 having, in this example, four inputs, receives first to fourth unary coded input signals $\alpha$, $\beta$, $\gamma$, $\delta$. A selector signal $\theta$ is received at a control input of the multiplexer 410. The selector signal $\theta$ in this example is a random number with a probability distribution function that causes the multiplexer 410 to select each input signal $\alpha$, $\beta$, $\gamma$, $\delta$ for the correct proportion of each computation period, such that over a given computation period the output y of the multiplexer 410 is a time division multiplexed signal containing appropriately weighted (in time) versions of the input signals and can be expressed as:

$y = \alpha w_\alpha + \beta w_\beta + \gamma w_\gamma + \delta w_\delta$ (where $w_\alpha$, $w_\beta$, $w_\gamma$ and $w_\delta$ are weightings to be applied to the variables $\alpha, \beta, \gamma$ and $\delta$ respectively).

Figure 5:
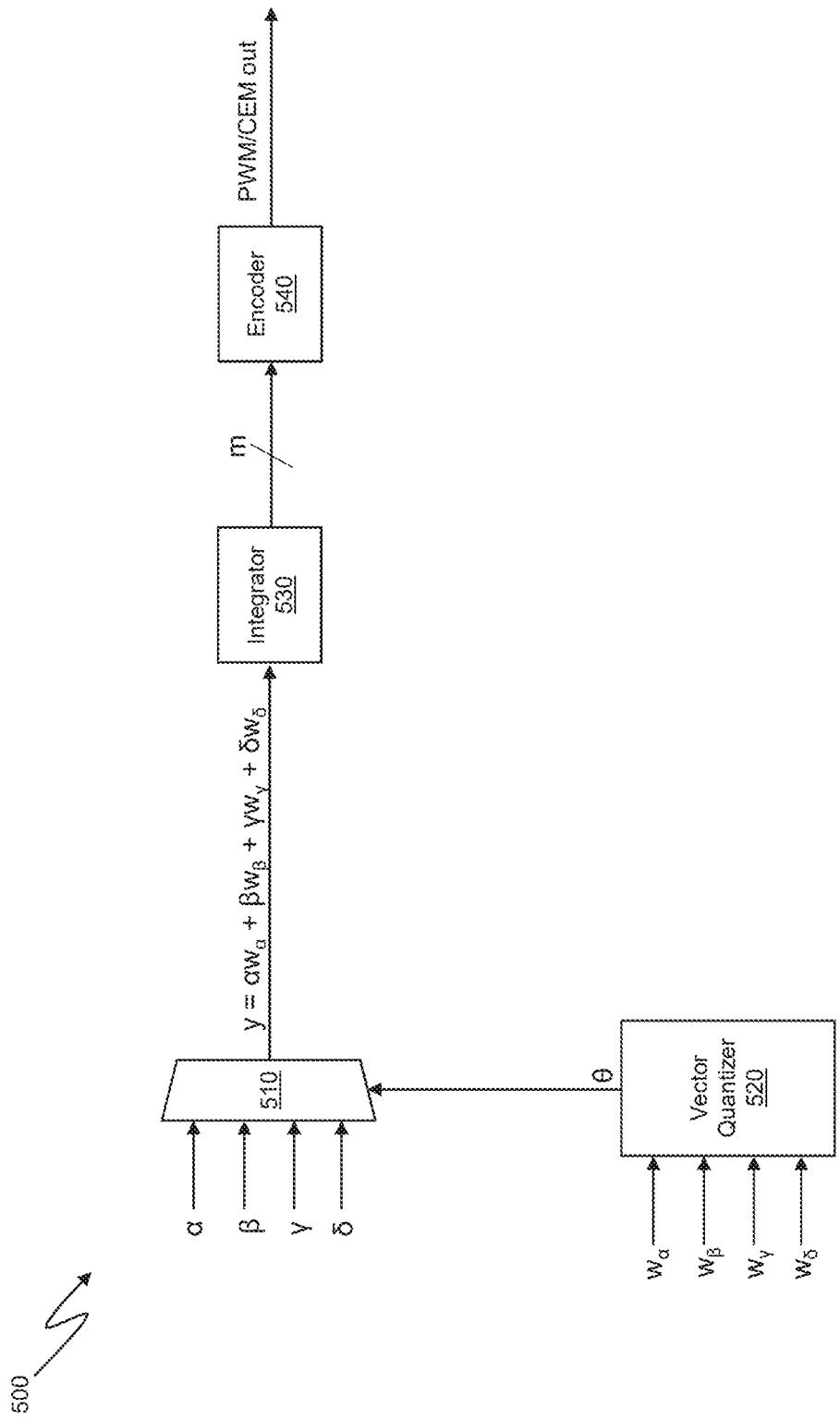
FIG. 5 is a schematic diagram illustrating circuitry for performing a MAC operation.

FIG. 5 is a schematic representation of circuitry implementing a further approach to performing a multiply-accumulate (MAC) operation on a plurality of operands represented by unary coded bitstreams.

The circuitry, shown generally at 500 in FIG. 5, includes multiplexer circuitry 510 having a plurality of inputs for receiving a plurality of unary coded bitstreams $\alpha$, $\beta$, $\gamma$, $\delta$ representing operands of the MAC operation. The circuitry 500 further includes vector quantizer circuitry 520 having a plurality of inputs for receiving a plurality of weighting signals $w_\alpha$, $w_\beta$, $w_\gamma$, $w_\delta$, each weighting signal corresponding to one of the plurality of bitstreams $\alpha$, $\beta$, $\gamma$, $\delta$ and representing a proportion of a computation time period for which that unary coded bitstream should be selected by the multiplexer circuitry 510 in order to correctly perform a MAC operation using the operands.

The circuitry 500 in this example further includes integrator circuitry 530 coupled to the output of the multiplexer circuitry 510 and configured to integrate the signal output by the multiplexer circuitry 510 over a time period p to generate an m-bit integrator output signal, and encoder circuitry 540 configured to encode the integrator output signal into a unary coded output signal. In some examples the encoder circuitry 540 comprises pulse width modulator circuitry, such that the unary coded output signal is a pulse width modulated (PWM) signal. In other examples, the integrator circuitry 530 encoder circuitry 540 may be configured to generate a consecutive edge modulated (CEM) signal as the unary coded output signal, as will be explained in more detail below.

In operation of the circuitry 500, the vector quantizer circuitry 520 receives the plurality of weighting signals $w_\alpha$, $w_\beta$, $w_\gamma$, $w_\delta$ and outputs a selector signal $\theta$ to cause the multiplexer circuitry 510 to select each input signal $\alpha$, $\beta$, $\gamma$, $\delta$ for the correct proportion of each computation period, such that over a given computation period the output y of the multiplexer circuitry 510 is a time division multiplexed signal of the form $y = \alpha w_\alpha + \beta w_\beta + \gamma w_\gamma + \delta w_\delta$.

The integrator circuitry 530 is configured to integrate the output signal y over a time period p and to output an integrated signal to the encoder 540, which encodes the integrated signal into a unary output signal. The integrator circuitry 530 may be generally conventional, and the encoder 540 may comprise, for example, a pulse width modulator. Alternatively, the integrator circuitry 530 and the encoder 540 may be provided by consecutive edge modulator circuitry, as described below with reference to FIG. 7.

Figure 6:
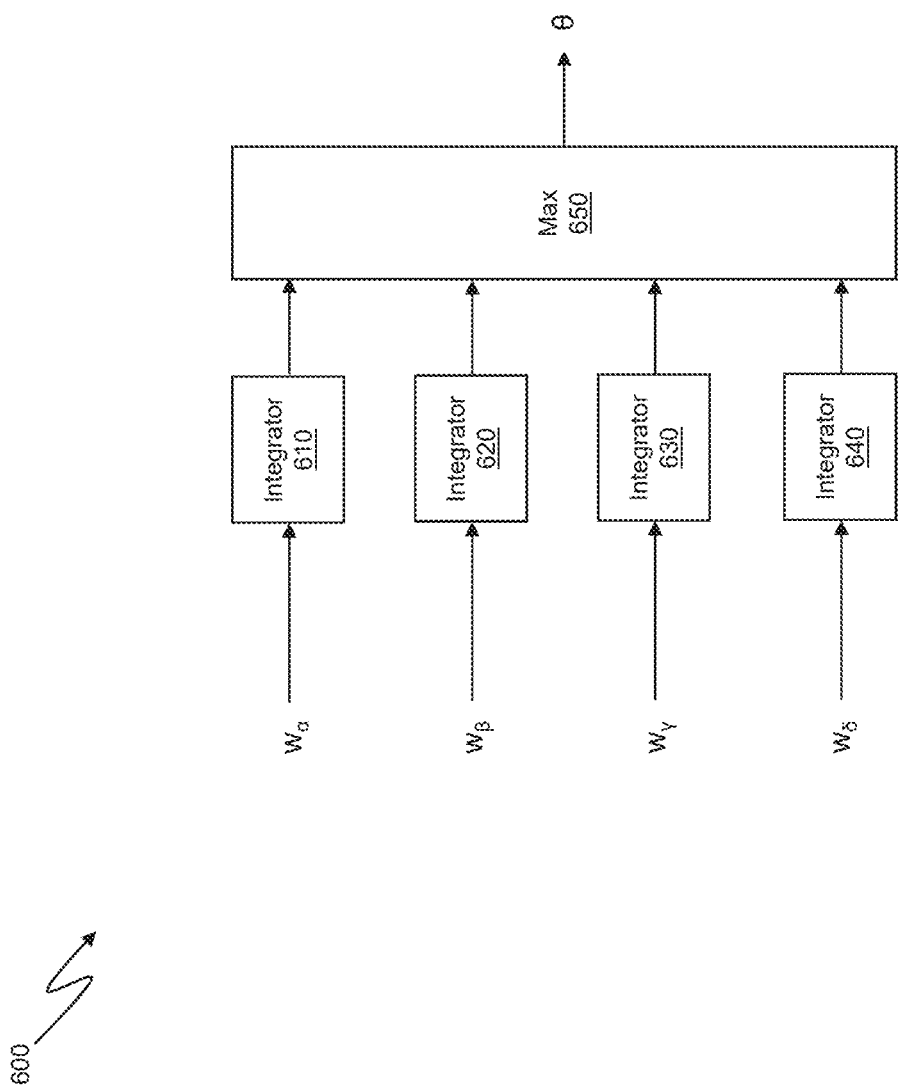
FIG. 6 is a schematic diagram illustrating circuitry for implementing a vector quantizer suitable for use in the circuitry of FIG. 5.

FIG. 6 is a schematic representation of example vector quantizer circuitry suitable for use in the circuitry 500 of FIG. 5.

The vector quantizer circuitry, shown generally at 600 in FIG. 6, comprises a plurality (in this example four) of integrators 610-640, each having an input for receiving a respective weighting signal $w_\alpha$, $w_\beta$, $w_\gamma$, $w_\delta$. An output of each of the integrators 610-640 is coupled to an input of a processing unit 650 which is configured to calculate, in each cycle of the computation period, the maximum among the signals received from the integrators 610-640, and to output a selector signal $\theta$ based on the determined maximum, to cause the multiplexer circuitry (e.g. multiplexer circuitry 510 in FIG. 5) to select the corresponding input signal $\alpha$, $\beta$, $\gamma$, $\delta$ for that cycle of the computation period.

In each cycle of the computation period the output of each integrator 610-640 increases by the respective weighting signal $w_\alpha$, $w_\beta$, $w_\gamma$, $w_\delta$, and the processing unit 650 determines the maximum among the signals output by the integrators 610-640 (i.e. which of the integrator output signals has the greatest value or magnitude). The processing unit 650 outputs a selector signal $\theta$ to cause the multiplexer to select the input signal $\alpha$, $\beta$, $\gamma$, $\delta$ that corresponds to the weighting signal $w_\alpha$, $w_\beta$, $w_\gamma$, $w_\delta$ whose integrator output is maximum, and resets the output of that integrator to 0.

In the example illustrated in Table 3 below, the weighting signals $w_\alpha$, $w_\beta$, $w_\gamma$, $w_\delta$ have values 0.1, 0.2, 0.3 and 0.4 respectively, and the weighting signals $w_\alpha$, $w_\beta$, $w_\gamma$, $w_\delta$ are provided to the first to fourth integrators 610-640 respectively. In a first computation cycle (cycle 1 in Table 3 below), the processing unit 650 determines that the output of the fourth integrator 640 has the maximum value (0.4) and thus outputs a selector signal $\theta$ of a suitable value (e.g. 4) to cause the multiplexer (e.g. multiplexer 510) to select the input signal $\delta$ that corresponds to the weighting signal $w_\delta$ that is provided to the fourth integrator 640. The processing unit then resets the output of the fourth integrator 640 to zero for the next computation cycle.

In cycle 2, the processing unit 650 determines that the output of the third integrator 630 has the maximum value (0.6) and thus outputs a selector signal $\theta$ of a suitable value (e.g. 3) to cause the multiplexer (e.g. multiplexer 510) to select the input signal $\beta$ that corresponds to the weighting signal $w_\gamma$ that is provided to the third integrator 630. The processing unit then resets the output of the third integrator 630 to zero for the next computation cycle.

In cycle 3, the processing unit 650 determines that the output of the second integrator 620 has the maximum value (0.6) and thus outputs a selector signal $\theta$ of a suitable value (e.g. 2) to cause the multiplexer (e.g. multiplexer 510) to select the input signal $\beta$ that corresponds to the weighting signal $w_\beta$ that is provided to the second integrator 620. The processing unit then resets the output of the second integrator 620 to zero for the next computation cycle.

In cycle 4, the processing unit 650 determines that the output of the fourth integrator 640 has the maximum value (0.8) and thus outputs a selector signal $\theta$ of a suitable value (e.g. 4) to cause the multiplexer (e.g. multiplexer 510) to again select the input signal $\delta$ that corresponds to the weighting signal $w_\delta$ that is provided to the fourth integrator 640. The processing unit then resets the output of the fourth integrator 640 to zero for the next computation cycle.

TABLE 3

| Cycle no. | Integrator 1 o/p | Integrator 2 o/p | Integrator 3 o/p | Integrator 4 o/p |
|---|---|---|---|---|
| 1 | 0.1 | 0.2 | 0.3 | 0.4 (max) |
| 2 | 0.2 | 0.4 | 0.6 (max) | 0 |
| 3 | 0.3 | 0.6 (max) | 0 | 0.4 |
| 4 | 0.4 | 0 | 0.3 | 0.8 (max) |
| 5 | 0.5 | 0.2 | 0.6 (max) | 0 |
| 6 | 0.6 (max) | 0.4 | 0 | 0.4 |
| 7 | 0 | 0.6 | 0.3 | 0.8 (max) |
| 8 | 0.1 | 0.8 (max) | 0.6 | 0 |
| 9 | 0.2 | 0 | 0.9 (max) | 0.4 |
| 10 | 0.3 | 0.2 | 0 | 0.8 (max) |

The processing unit 650 continues to output a selector signal θ of a suitable value to cause the multiplexer to select the input signal that corresponds to the weighting signal that is provided to the integrator that outputs the maximum value in a computation cycle until the total number of computation cycles that make up the computation period have elapsed.

In this way the multiplexer 510 can be made to select each input signal for the correct proportion of the computation time to produce the correct result of the MAC operation.

In the example shown in Table 3 below, the weights assigned to the input signals α, β, γ, δ are 0.1, 0.2, 0.3 and 0.4 respectively, meaning that input signal α should be selected for 0.1 of a computation period, input signal β should be selected for 0.2 of a computation period, input signal γ should be selected for 0.3 of a computation period, and input signal δ should be selected for 0.4 of a computation period. As can be seen from Table 3 above, the output of the first integrator 610 has the maximum value once in a computation period of ten cycles, such that the input signal α will be selected for 0.1 of the duration of the computation period. Similarly, the output of the second integrator 620 has the maximum value twice in a computation period, such that the input signal β will be selected for 0.2 of the duration of the computation period, the output of the third integrator 630 has the maximum value three times in a computation period, such that the input signal γ will be selected for 0.3 of the duration of the computation period, and the output of the fourth integrator 640 has the maximum value four times in a computation period, such that the input signal δ will be selected for 0.4 of the duration of the computation period.

It may be desirable to add a degree of dither to interrupt or break up periodic behaviours in the output of the vector quantizer circuitry 600. To effect dither, whenever one of the integrators 610-640 is reset a small random number can be added to its output, so that the integrator is initialised to a small random number rather than zero.

It will be appreciated that the vector quantizer circuitry 600 of FIG. 6 is just one example of vector quantizer circuitry that is suitable for use as the vector quantizer circuitry 520 in the circuitry 500 of FIG. 5, and that other vector quantizer architectures, e.g. a tree-based modulator architecture, could equally be used as the vector quantizer circuitry 520.

Figure 7:
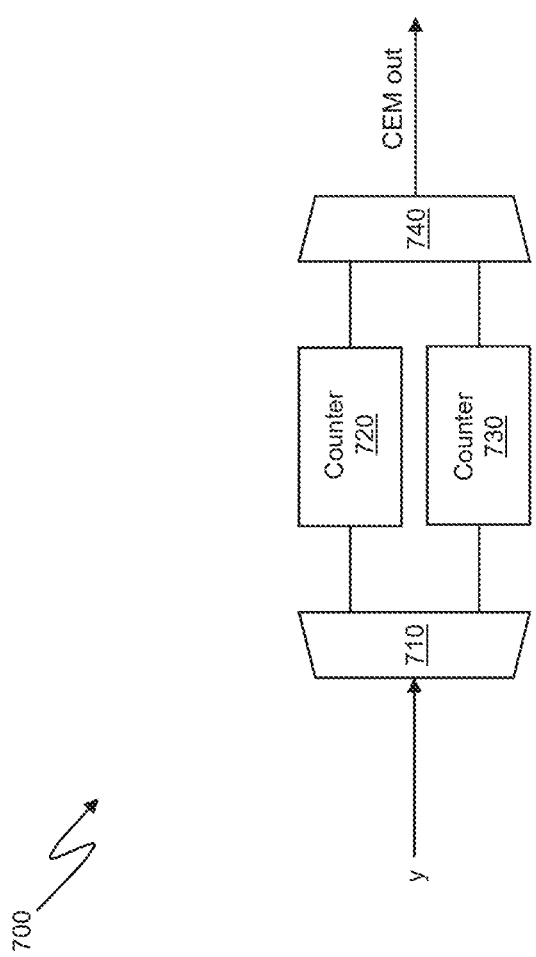
FIG. 7 is a schematic diagram illustrating encoder circuitry for encoding a stochastic signal into consecutive edge modulated (CEM) signal.

FIG. 7 is a schematic diagram illustrating example modulator circuitry suitable for integrating and encoding the signal output by the multiplexer 510 of FIG. 500 into a consecutive edge modulated (CEM) output signal.

The modulator circuitry, shown generally at 700 in FIG. 7 (which may be referred to as a stochastic to CEM converter), comprises a demultiplexer 710, first and second counters 720, 730 and a selector 740. The first and second counters may be, for example, Mobius counters, ring counters, shift registers or any other form of counter suitable for counting the number of logic ones in an input bitstream signal.

The demultiplexer 710 has an input for receiving an input bitstream y, e.g. from the multiplexer 510 of the circuitry 500 of FIG. 5. A first output of the demultiplexer is coupled to an input of the first counter 720, and a second output of the demultiplexer 730 is coupled to an input of the second counter 730. An output of the first counter 720 is coupled to a first input of the selector 740, and an output of the second counter 730 is coupled to a second input of the selector 740.

In operation of the modulator circuitry 700, the input bitstream y is received at the input of the demultiplexer 710. The demultiplexer 710 is operative to couple the input of the first counter 720 to the input of the demultiplexer 710 for odd-numbered frames of the input signal y, and to couple the input of the second counter 730 to the input of the demultiplexer 710 for even-numbered frames of the input signal y. (A frame of the input signal y comprises a predefined number of bits of the input signal, e.g. 8 bits).

The first counter 720 is configured to count the number of logic ones in an odd-numbered frame of the input signal y that it receives from the demultiplexer 710, and to generate a bitstream signal comprising a number of logic ones that is equal to the number of logic ones present in the input signal y in the frame period, followed by a number of logic zeros that is equal to the number of logic zeros present in the input signal y in the frame period. In other words, the first counter 720 is operative to generate a pulse width modulated output signal having a positive pulse whose width is dependent upon the number of logic ones present in the input signal y in the frame period.

Similarly, the second counter 730 is configured to count the number of logic ones in an even-numbered frame of the input signal y that it receives from the demultiplexer 710, and to generate a bitstream signal comprising a number of logic ones that is equal to the number of logic ones present in the input signal y in the frame period, followed by a number of logic zeros that is equal to the number of logic zeros present in the input signal y in the frame period. Thus, the second counter 730 is also operative to generate a pulse width modulated output signal having a positive pulse whose width is dependent upon the number of logic ones present in the input signal y in the frame period.

The selector 740 is configured to select the output of the first counter 720 during even-numbered frames of the input signal y, and to select the output of the second counter 730 during odd-numbered frames of the input signal.

During even-numbered frames of the input signal y, the selector 740 reads the bitstream generated by the first counter 720 and outputs the bitstream as the CEM output signal. During odd-numbered frames of the input signal y, the selector 740 reads the bitstream generated by the second counter 730 and outputs the bitstream, in reverse order, as the CEM output signal.

For example, the first and second counters 720, 730 may each comprise a register of length equal to frame length of input signal (i.e. if frame length is 8 bits then register length is also 8 bits). At the start of a frame period of the input signal the relevant register (i.e. the register of the first counter 720 if the frame period is odd-numbered or the register of the second counter 730 if the frame period is even-numbered) is reset to all 0. Every time a 1 is detected in the input signal y the bits in the register shift one position to the right and the most significant bit (MSB) of the register is set to one. Thus at the end of frame period the register will contain a number of ones equal to the number of ones in the frame of the input signal y, starting at the MSB position, followed by a number of 0s equal to the number of zeros in the input frame.

During even-numbered frame periods of the input signal y, the selector 740 reads the contents of the register of the first counter 720 (which were entered into the register during the immediately preceding frame period of the input signal) in most significant bit (MSB) to least significant bit (LSB) order, such that output signal of the selector 740 during even-numbered frame periods of the input signal is the same as the contents of the register of the first counter. During odd-numbered frame periods of the input signal the selector 740 reads the contents of the register of the second counter 730 (which were entered into the register during the immediately preceding frame period of the input signal) in LSB to MSB order, such that output signal of the selector 740 is inverted in time with respect to the contents of register of the second counter 720.

Table 4 below illustrates the operation of the first and second counters 720, 730 and the selector 740 for an example input signal y comprising four 8 bit frames. It will be noted that the selector output for frame 2 is identical to the bitstream generated by the first counter 720 during frame 1. The selector output for frame 3 is a time-reversed version of the bitstream generated by the second counter 730 during frame 2. The selector output for frame 4 is identical to the bitstream generated by the first counter 720 during frame 3, and the selector output for frame 5 is a time-reversed version of the bitstream generated by the second counter 730 during frame 4.

TABLE 4

|  | Frame 1 | Frame 2 | Frame 3 | Frame 4 | Frame 5 |
|---|---|---|---|---|---|
| Input signal y | 10011011 | 01011010 | 10111011 | 01001100 |  |
| Counter 1 | 11111000 |  | 11111100 |  |  |
| Counter 2 |  | 11110000 |  | 11100000 |  |
| Selector output |  | 11111000 | 00001111 | 11111100 | 00000111 |

Figure 8:
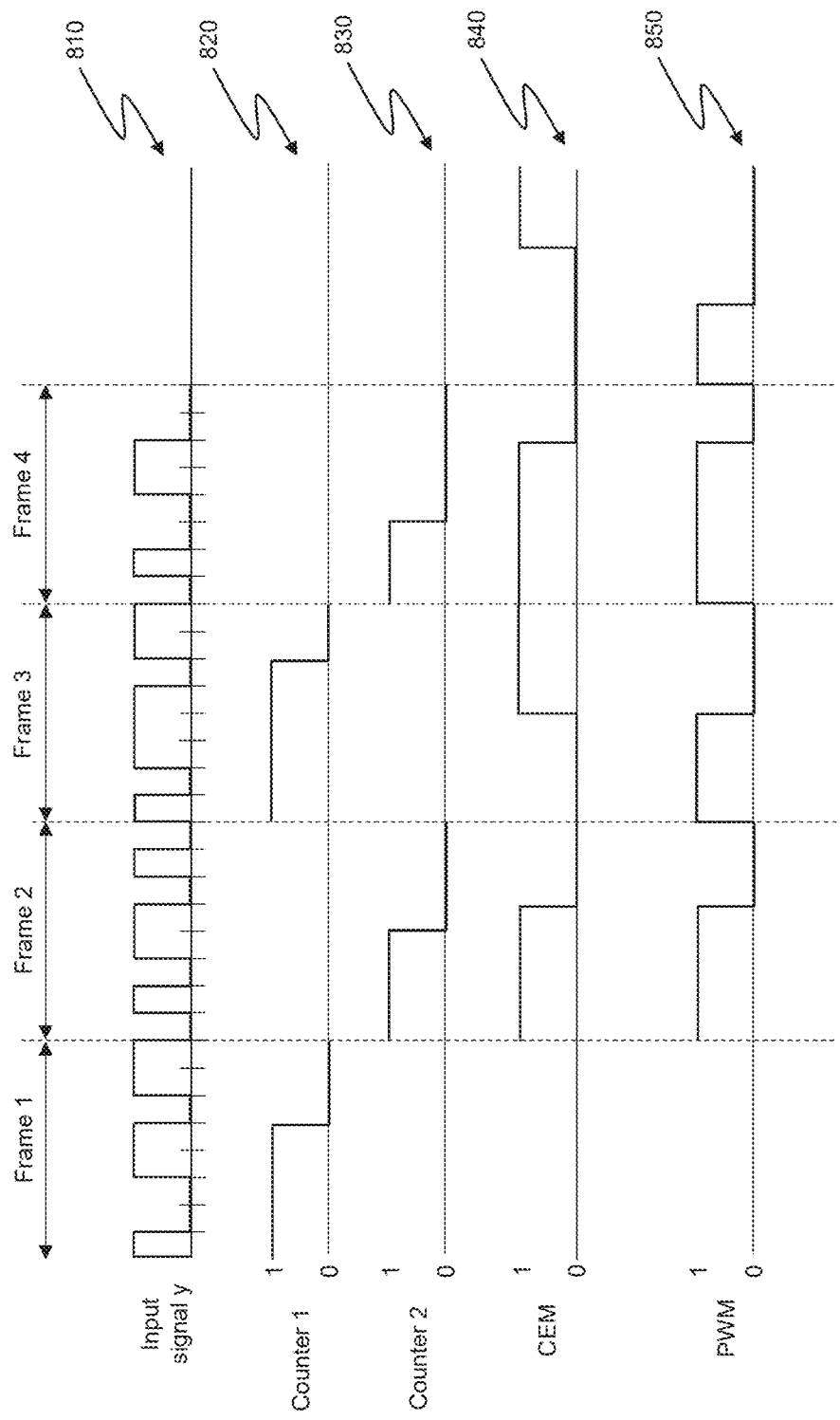
FIG. 8 illustrates signals in the encoder circuitry of FIG. 7.

FIG. 8 shows the example input signal y shown in Table 4 above as trace 810, the signals generated by the first and second counters 720, 730 (traces 820 and 830 respectively) and the CEM output signal generated by the selector 740 (trace 840).

FIG. 8 also shows, in trace 850, a PWM signal representing the input signal y. As can be seen, the PWM signal 850 has seven transitions between logic 0 and logic 1 states, whereas the CEM signal output by the selector 740 has only 4 such transitions. As will be appreciated, the reduced number of transitions in the CEM output signal 840, as compared to the PWM signal 850 gives rise to reduced power consumption in the CEM modulator circuitry 700, as compared to conventional PWM modulator circuitry.

Further, the use of a CEM signal as the output signal is beneficial where the circuitry 500 is used for applications such as circuitry implementing a convolutional neural network (CNN), as the CEM signal facilitates implementation of a non-linear activation function, as discussed in more detail below.

Figure 9:
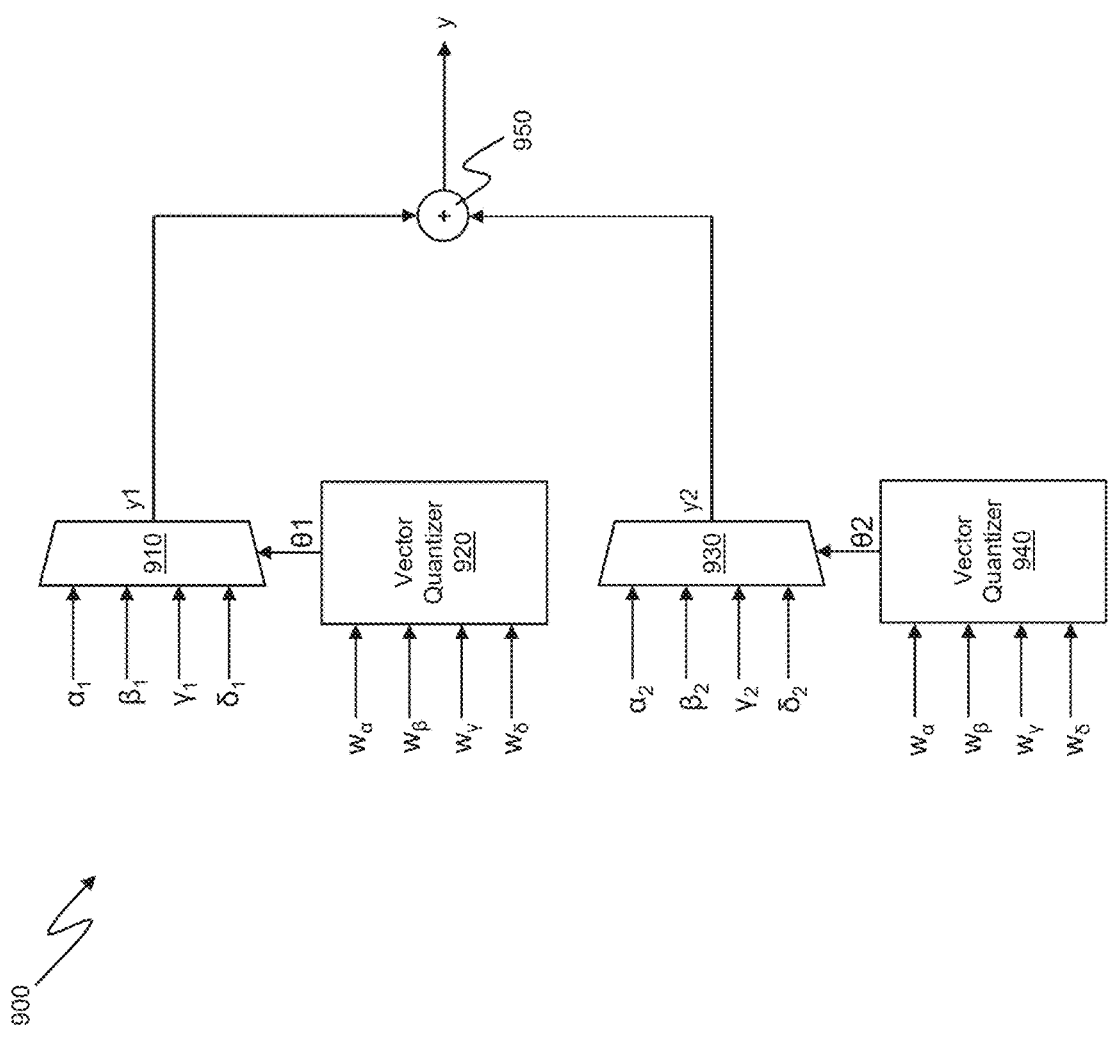
FIG. 9 is a schematic diagram illustrating alternative circuitry for performing a MAC operation.

FIG. 9 is a schematic diagram illustrating alternative circuitry for performing a MAC operation with improved efficiency, as compared to the circuitry 500 of FIG. 5, by performing a plurality of MAC operations using the same weighting signals in parallel.

The circuitry, shown generally at 900 in FIG. 9, includes first multiplexer circuitry 910 having a plurality of inputs for receiving a first plurality of unary coded input bitstreams $\alpha_1$, $\beta_1$, $\gamma_1$, $\delta_1$ representing operands of a first MAC operation. The circuitry 900 further includes first vector quantizer circuitry 920 having a plurality of inputs for receiving a plurality of weighting signals $w_\alpha$, $w_\beta$, $w_\gamma$, $w_\delta$, each weighting signal representing a proportion of a computation time period for which a respective one of the first plurality of unary coded input bitstreams $\alpha_1$, $\beta_1$, $\gamma_1$, $\delta_1$ should be selected by the first multiplexer circuitry 910 in order to correctly perform the first MAC operation using the operands.

The circuitry 900 further includes second multiplexer circuitry 930 having a plurality of inputs for receiving a second plurality of unary coded input bitstreams $\alpha_2$, $\beta_2$, $\gamma_2$, $\delta_2$ representing operands of a second MAC operation. The circuitry 900 further includes second vector quantizer circuitry 940 having a plurality of inputs for receiving the plurality of weighting signals $w_\alpha$, $w_\beta$, $w_\gamma$, $w_\delta$, which again represent a proportion of a computation time period for which a respective one of the second plurality of unary coded input bitstreams $\alpha_2$, $\beta_2$, $\gamma_2$, $\delta_2$ should be selected by the second multiplexer circuitry 920 in order to correctly perform the second MAC operation using the operands. Thus, the same weightings are applied to the first plurality of unary coded input bitstreams and to the second plurality of unary coded input bitstreams. If the first and second vector quantizer circuitry 920, 940 are dithered differently (e.g. a source of dither for the first vector quantizer circuitry 920 is independent from a source of dither for the second vector quantizer circuitry 940), then the circuitry 900 will accelerate convergence.

The circuitry 900 further includes adder circuitry 950 configured to receive output bitstream signals y1, y2 of the first and second multiplexer circuitry 910, 930 and to combine the received bitstreams into a single output bitstream y representing the sum of the results of the combination of first and second MAC operations.

The circuitry 900 may further include integrator circuitry 530 and an encoder 540 of the kind described above with reference to FIG. 5, for integrating the output signal y and encoding the integrated signal into a unary coded signal. Alternatively, the circuitry 900 may further comprise CEM encoder circuitry 700 of the kind described above with reference to FIG. 7, for encoding the output signal y as a CEM signal.

The first and second vector quantizer circuitry 920, 940 may each comprise vector quantizer circuitry of the kind described above with reference to FIG. 6, or alternatively may comprise circuitry implementing some other vector quantizer architecture such as a tree-based modulator.

In operation of the circuitry 900, the first and second vector quantizer circuitry 920, 940 each receive the plurality of weighting signals $w_\alpha$, $w_\beta$, $w_\gamma$, $w_\delta$. The first vector quantizer circuitry 920 outputs a first selector signal θ1 to cause the first multiplexer circuitry 910 to select each input signal $\alpha_1$, $\beta_1$, $\gamma_1$, $\delta_1$ for the correct proportion of each computation period, such that over a given computation period the output y1 of the first multiplexer circuitry 910 is a time division multiplexed signal of the form $$y1 = \alpha_1 w_\alpha + \beta_1 w_\beta + \gamma_1 w_\gamma + \delta_1 w_\delta,$$

Similarly, the second vector quantizer circuitry 940 outputs a second selector signal θ2 to cause the second multiplexer circuitry 930 to select each input signal $\alpha_2, \beta_2, \gamma_2, \delta_2$ for the correct proportion of each computation period, such that over a given computation period the output y2 of the second multiplexer circuitry 930 is a time division multiplexed signal of the form $$y2 = \alpha_2 w_\alpha + \beta_2 w_\beta + \gamma_2 w_\gamma + \delta_2 w_\delta.$$

The adder circuitry 950 receives the output bitstream signals y1 and y2 and combines them into a combined output bitstream y containing both of the bitstream signals y1 and y2. By varying the dither between the first and second vector quantizer circuitry 920, 940 (e.g. as discussed above in relation to the vector quantizer circuitry 600 of FIG. 6), it is possible to ensure that the bitstream signals y1 and y2 are different.

The circuitry 900 of FIG. 9 is particularly suited to applications where the same weights are to be applied to different sets of input signals, for example circuitry that implements a convolutional neural network (CNN) or the like.

It will be appreciated that the circuitry 900 illustrated in FIG. 9 could be extended to include further multiplexer circuitry, each additional instance of multiplexer circuitry having an associated instance of vector quantizer circuitry. For example, in an implementation having six instances of multiplexer circuitry for receiving six sets of input signals, there will also be six instances of vector quantizer circuitry for receiving a common set of weighting signals to be applied to each set of input signals.

Figure 10:
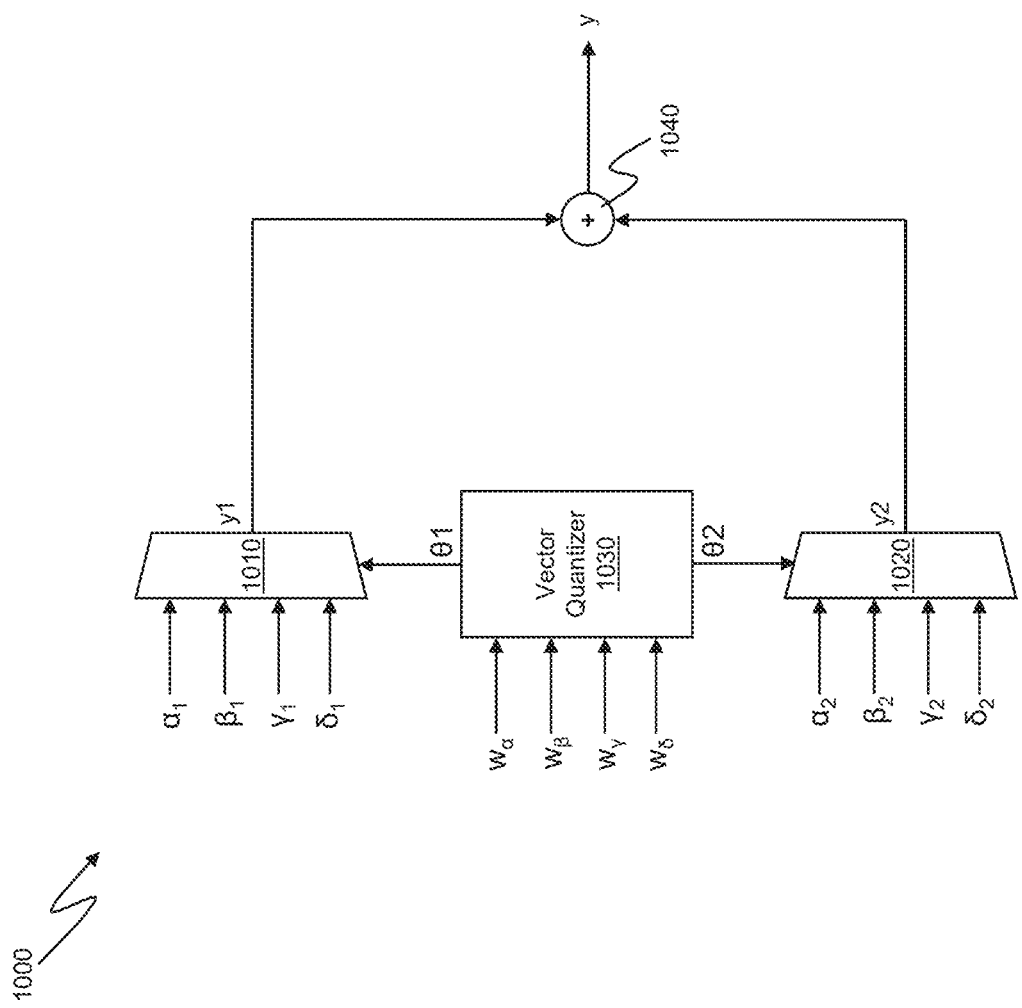
FIG. 10 is a schematic diagram illustrating further alternative circuitry for performing a MAC operation.

FIG. 10 is a schematic diagram illustrating further alternative circuitry for performing a MAC operation.

The circuitry, shown generally at 1000 in FIG. 10, includes first multiplexer circuitry 1010 having a plurality of inputs for receiving a first plurality of unary coded bitstreams $\alpha_1, \beta_1, \gamma_1, \delta_1$ representing operands of a first MAC operation and second multiplexer circuitry 1020 having a plurality of inputs for receiving a second plurality of unary coded bitstreams $\alpha_2, \beta_2, \gamma_2, \delta_2$ representing operands of a second MAC operation.

The circuitry 1000 further includes vector quantizer circuitry 1030 which is common to both the first and the second multiplexer circuitry 1010, 1020. The vector quantizer circuitry 1030 has a plurality of inputs for receiving a plurality of weighting signals $w_\alpha, w_\beta, w_\gamma, w_\delta$, each weighting signal representing a proportion of a computation time period for which a respective unary coded bitstream of each of the first and second plurality of input unary bitstreams should be selected by the first and second multiplexer circuitry 1010, 1020 in order to correctly perform the first and second MAC operations using the operands.

As in the circuitry 900, the circuitry 1000 includes adder circuitry configured to receive output bitstream signals y1, y2 of the first and second multiplexer circuitry 1010, 1020 and to combine the received bitstreams into a single output bitstream y representing the sum of the results of the combination of first and second MAC operations.

The circuitry 1000 may further include integrator circuitry 530 and an encoder 540 of the kind described above with reference to FIG. 5, for integrating the output signal y and encoding the integrated signal into a unary coded signal. Alternatively, the circuitry 1000 may further comprise CEM encoder circuitry 700 of the kind described above with reference to FIG. 7, for encoding the output signal y as a CEM signal.

The vector quantizer circuitry 1030 may comprise vector quantizer circuitry of the kind described above with reference to FIG. 6, or alternatively may comprise circuitry implementing some other vector quantizer architecture such as a tree-based modulator.

In operation of the circuitry 1000, the vector quantizer circuitry 1030 receives the plurality of weighting signals $w_\alpha, w_\beta, w_\gamma, w_\delta$ and outputs a first selector signal θ1 to cause the first multiplexer circuitry 1010 to select each input signal $\alpha_1, \beta_1, \gamma_1, \delta_1$ for the correct proportion of each computation period, such that over a given computation period the output y1 of the first multiplexer circuitry 1010 is a time division multiplexed signal of the form $$y1 = \alpha_1 w_\alpha + \beta_1 w_\beta + \gamma_1 w_\gamma + \delta_1 w_\delta.$$

The vector quantizer circuitry 1030 also outputs a second selector signal θ2 to cause the second multiplexer circuitry 1020 to select each input signal $\alpha_2, \beta_2, \gamma_2, \delta_2$ for the correct proportion of each computation period, such that over a given computation period the output y2 of the second multiplexer circuitry 1020 is a time division multiplexed signal of the form $$y2 = \alpha_2 w_\alpha + \beta_2 w_\beta + \gamma_2 w_\gamma + \delta_2 w_\delta.$$

The adder circuitry 1040 receives the output bitstream signals y1 and y2 and combines them into a combined output bitstream y containing both of the bitstream signals y1 and y2.

The circuitry 1000 of FIG. 10 is also well suited to applications where the same weights are to be applied to different sets of input signals, for example circuitry that implements a convolutional neural network (CNN) or the like. In comparison with the circuitry 900 of FIG. 9, the circuitry 1000 of FIG. 10 has reduced power consumption, because instead of having a plurality of multiplexers, each having an associated vector quantizer, a single vector quantizer can be shared between multiple (two, in the example of FIG. 10) multiplexers.

As before, it will be appreciated that the circuitry 1000 could be extended to include more instances of multiplexer circuitry, with additional instances of vector quantizer circuitry as necessary to support and control the additional multiplexer circuitry.

An architecture comprising a vector quantizer and a plurality of multiplexers is particularly suited for use in circuitry implementing a convolution layer of a convolutional neural network (CNN).

Figure 11:
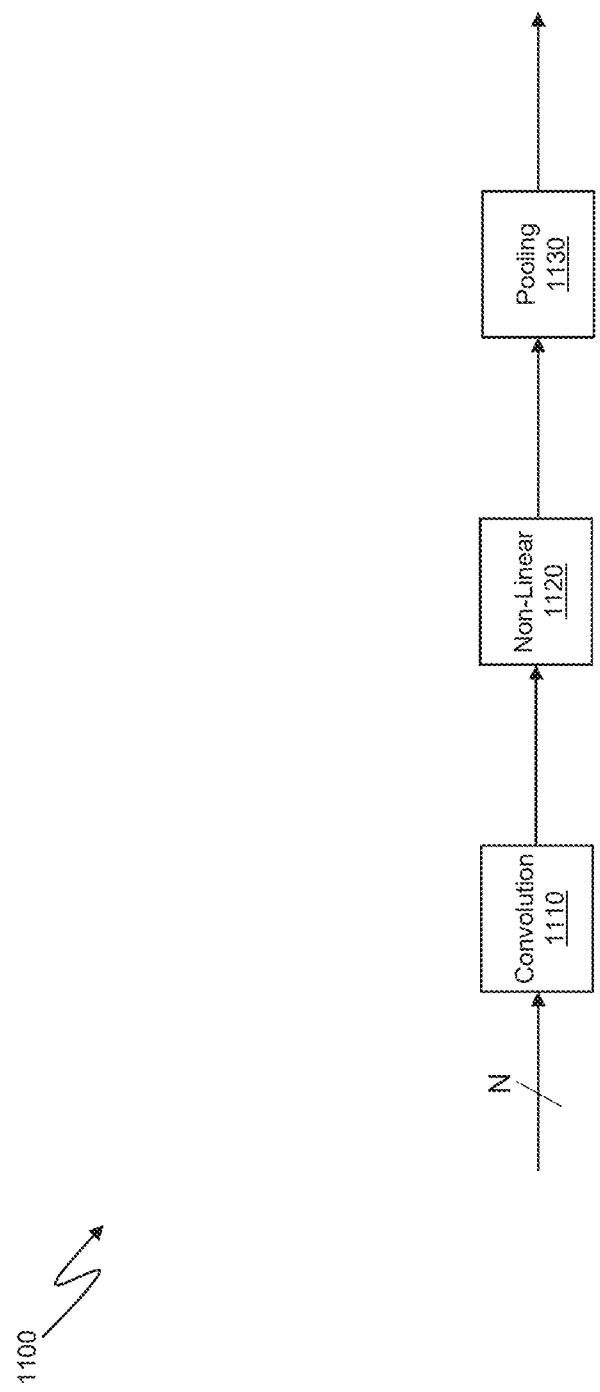
FIG. 11 is a schematic diagram illustrating functional blocks of a typical convolutional neural network (CNN)

FIG. 11 is a schematic diagram illustrating functional blocks of a typical CNN. As shown, the CNN 1100 includes a convolution block 1110, a non-linear function block 1120 and a pooling block 1130.

The convolution block 1110 is configured to apply a kernel (e.g. a common set of weights) to different subsets of a set of input data. The non-linear function block 1120 is configured to receive output data from the convolution block and to perform a non-linear activation function such as a rectified linear unit (ReLU) activation function on the received data. The pooling block 1130 is configured to perform a pooling function on data output by the non-linear function block 1120.

Figure 12:
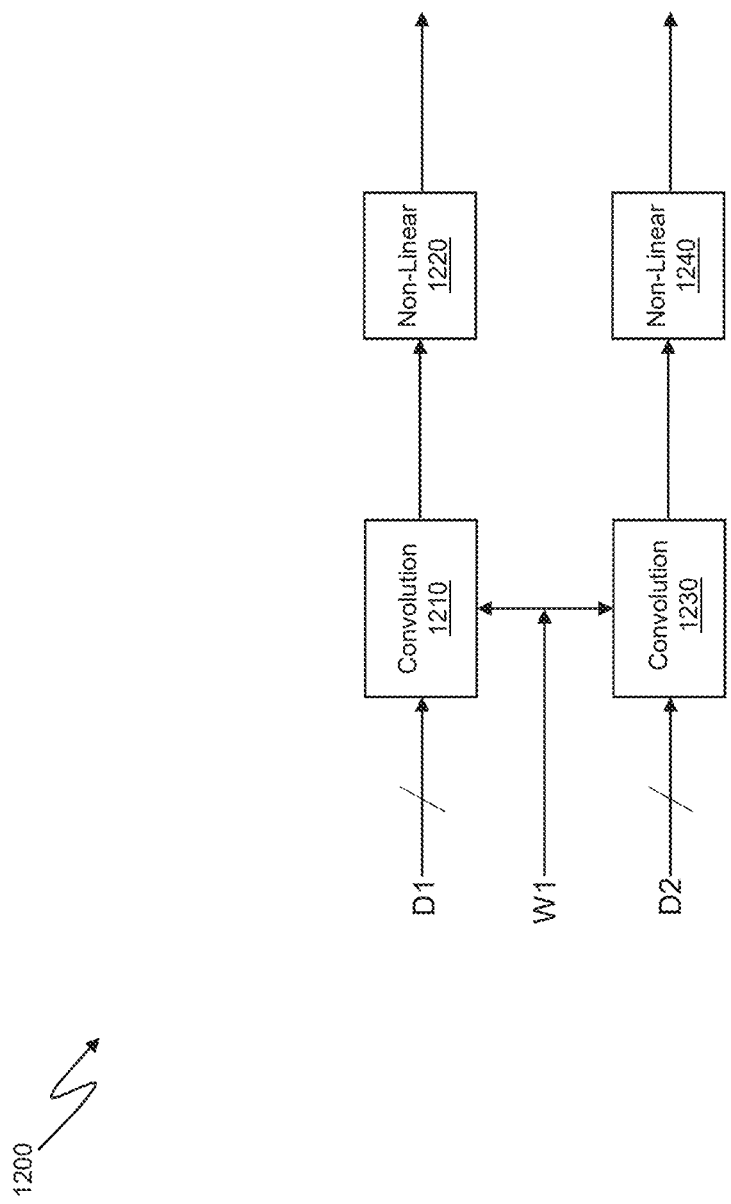
FIG. 12 is a schematic diagram illustrating example operations performed by circuitry implementing a convolutional neural network.

FIG. 12 is a schematic diagram illustrating example operations performed by circuitry implementing a convolutional neural network (CNN).

In order to perform convolution of the kernel with the input data set, the kernel is applied in turn to different subsets of the input data set (which in some examples may be overlapping subsets of the input data set), typically using a matrix multiplication operation. The matrix multiplication operations are represented in FIG. 12 by first and second convolution operations 1210, 1220 (though it will be appreciated by those of ordinary skill in the art that a typical convolution block or layer will perform more than two such convolution operations).

As shown, a first convolution operation 1210 is performed on a first subset (e.g. a first vector) D1 of input data and a kernel W1 of weight data. A first non-linear activation function 1220 is performed on the result of the first convolution operation 1210. A second convolution operation 1230 is performed on a second subset (e.g. a second vector) D2 of the input data and the kernel W1, and a second non-linear activation function 1240 is performed on the result of the second convolution operation 1230.

Figure 13:
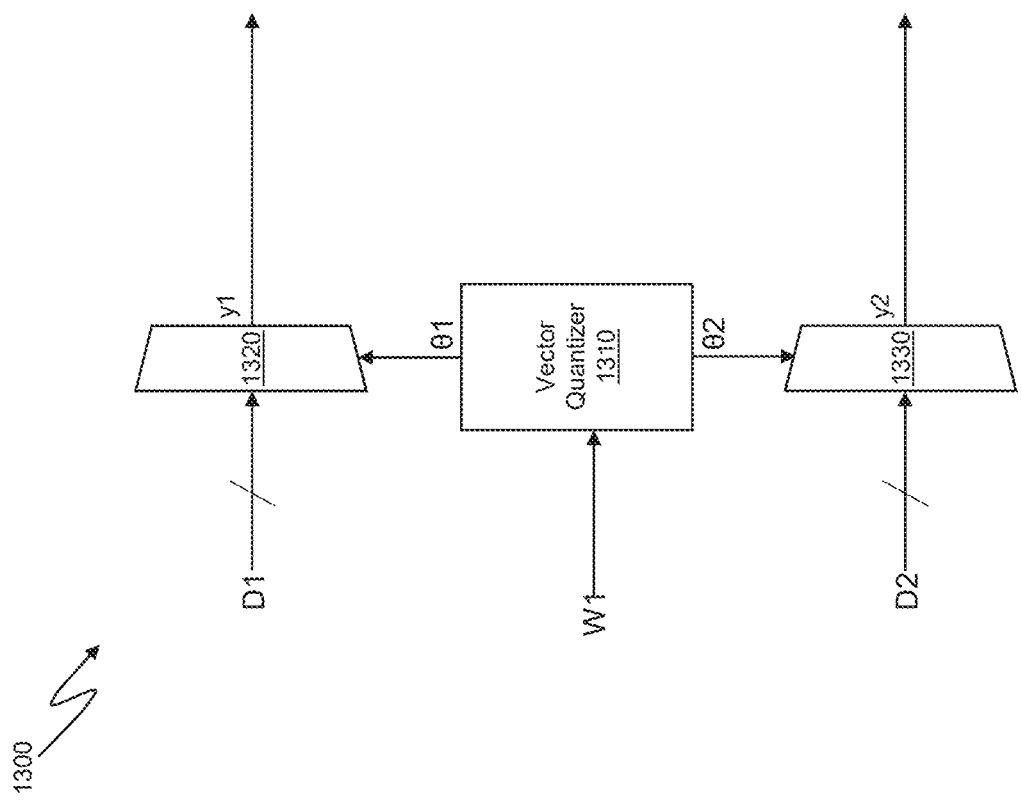
FIG. 13 is a schematic diagram illustrating circuitry for implementing convolution operations.

As will be apparent from the foregoing disclosure, because the convolution operations 1210, 1230 are matrix multiplication operations, they can be implemented as multiply-accumulate (MAC) operations using stochastic computing techniques, and thus can be implemented in circuitry using a combination of a plurality of multiplexers and a vector quantizer that is coupled to each of the plurality of multiplexers, as shown in FIG. 13.

The circuitry, shown generally at 1300 in FIG. 13, comprises vector quantizer circuitry 1310 and first and second multiplexer circuitry 1320, 1330.

The vector quantizer circuitry 1310 is configured to receive the kernel W1 as a set of weighting signals $w_\alpha$, $w_\beta$, $w_\gamma$, $w_\delta$. The first multiplexer circuitry 1320 is configured to receive the first subset D1 as a first set of unary coded bitstreams $\alpha_1$, $\beta_1$, $\gamma_1$, $\delta_1$, and the second multiplexer circuitry 1330 is configured to receive the second subset D2 of input data as a second set of unary coded bitstreams $\alpha_2$, $\beta_2$, $\gamma_2$, $\delta_2$ of input data.

The first and second multiplexer circuitry 1320, 1330 are coupled to the vector quantizer circuitry 1310 so as to receive respective first and second selector signals θ1, θ2 from the vector quantizer circuitry 1310.

In operation of the circuitry 1300, the vector quantizer circuitry 1310 outputs the first selector signal $\theta_1$ to cause the first multiplexer circuitry 1320 to select each input signal $\alpha_1$, $\beta_1$, $\gamma_1$, $\delta_1$ for the correct proportion of each computation period, such that over a given computation period the output y1 of the first multiplexer circuitry 1320 is a time division multiplexed signal of the form $$y1 = \alpha_1 w_\alpha + \beta_1 w_\beta + \gamma_1 w_\gamma + \delta_1 w_\delta.$$

Similarly, the vector quantizer circuitry 1310 outputs the second selector signal θ2 to cause the second multiplexer circuitry 1330 to select each input signal $\alpha_2$, $\beta_2$, $\gamma_2$, $\delta_2$ for the correct proportion of each computation period, such that over a given computation period the output y2 of the second multiplexer circuitry 1330 is a time division multiplexed signal of the form $$y2 = \alpha_2 w_\alpha + \beta_2 w_\beta + \gamma_2 w_\gamma + \delta_2 w_\delta.$$

As will be appreciated, in a practical implementation of a CNN, the convolution block or layer will be required to perform more than two matrix multiplication operations in order to perform convolution of the whole input data set with the kernel. Each additional matrix multiplication operation can be implemented simply by coupling an additional multiplexer to the vector quantizer circuitry 1310. Thus, if the input data set were divided into four subsets D1-D4, the circuitry 1300 would include four multiplexers coupled to the vector quantizer circuitry 1310, each multiplexer receiving a different one of the subsets D1-D4 of the input data.

Thus the architecture shown in FIG. 13 permits low-power performance of the convolution operations required by the convolution block or layer of a CNN.

As discussed briefly above, the use of a consecutive edge modulated (CEM) signal facilitates implementation of a non-linear activation function.

Figure 14:
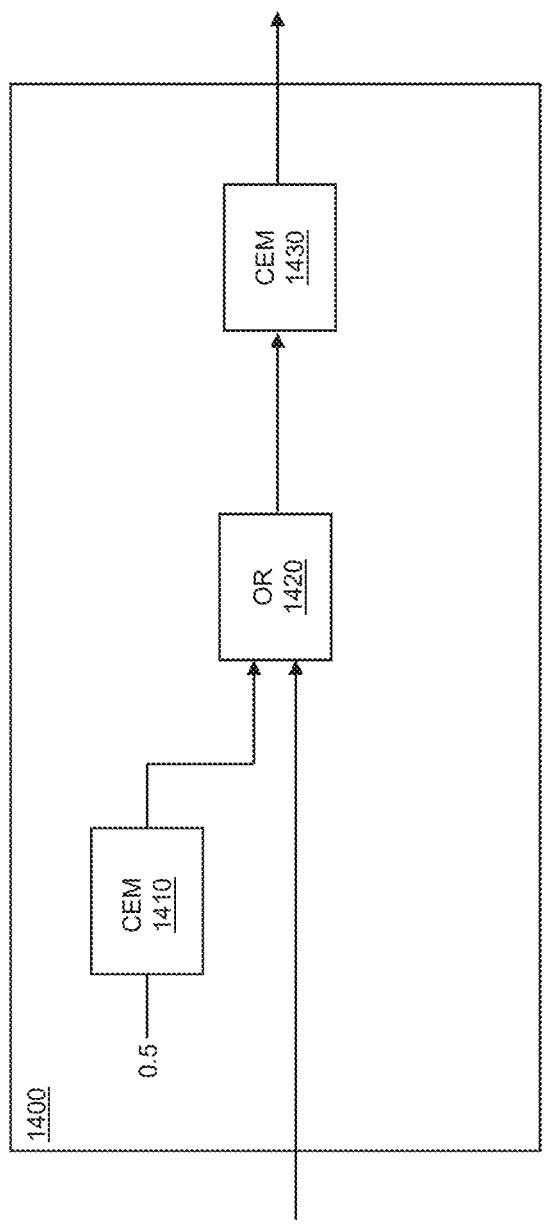
FIG. 14 is a schematic diagram illustrating circuitry for implementing a non-linear function.

FIG. 14 is a schematic representation of circuitry for implementing a non-linear function (such as the non-linear functions 1120, 1220, 1240 of FIGS. 11-13). The circuitry, shown generally at 1400 in FIG. 14, comprises first CEM modulator circuitry 1410, an OR gate 1420, and second CEM modulator circuitry 1430.

The first CEM modulator circuitry 1410 receives a unary coded signal representing the value 0.5, and outputs a corresponding CEM signal to a first input of the OR gate 1420. A second input of the OR gate 1420 receives the signal output by a multiplexer (e.g. the first or second multiplexer 1310, 1320 of FIG. 13). The output of the OR gate 1420 is coupled to an input of the second CEM modulator circuitry 1430, which outputs a CEM modulated signal representing the signal received at its input.

Figure 15:
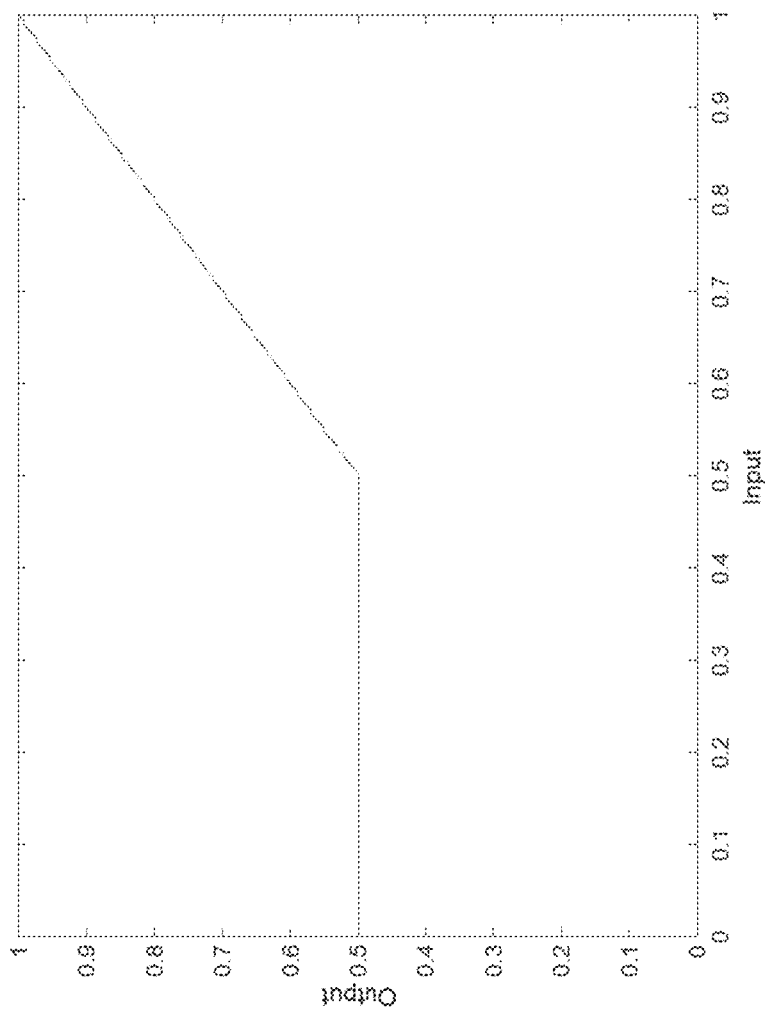
FIG. 15 illustrates a transfer function of the circuitry of FIG. 14.

The circuitry 1400 has a transfer function of the form shown in FIG. 15, which corresponds to the transfer function of a ReLU function.

Figure 16:
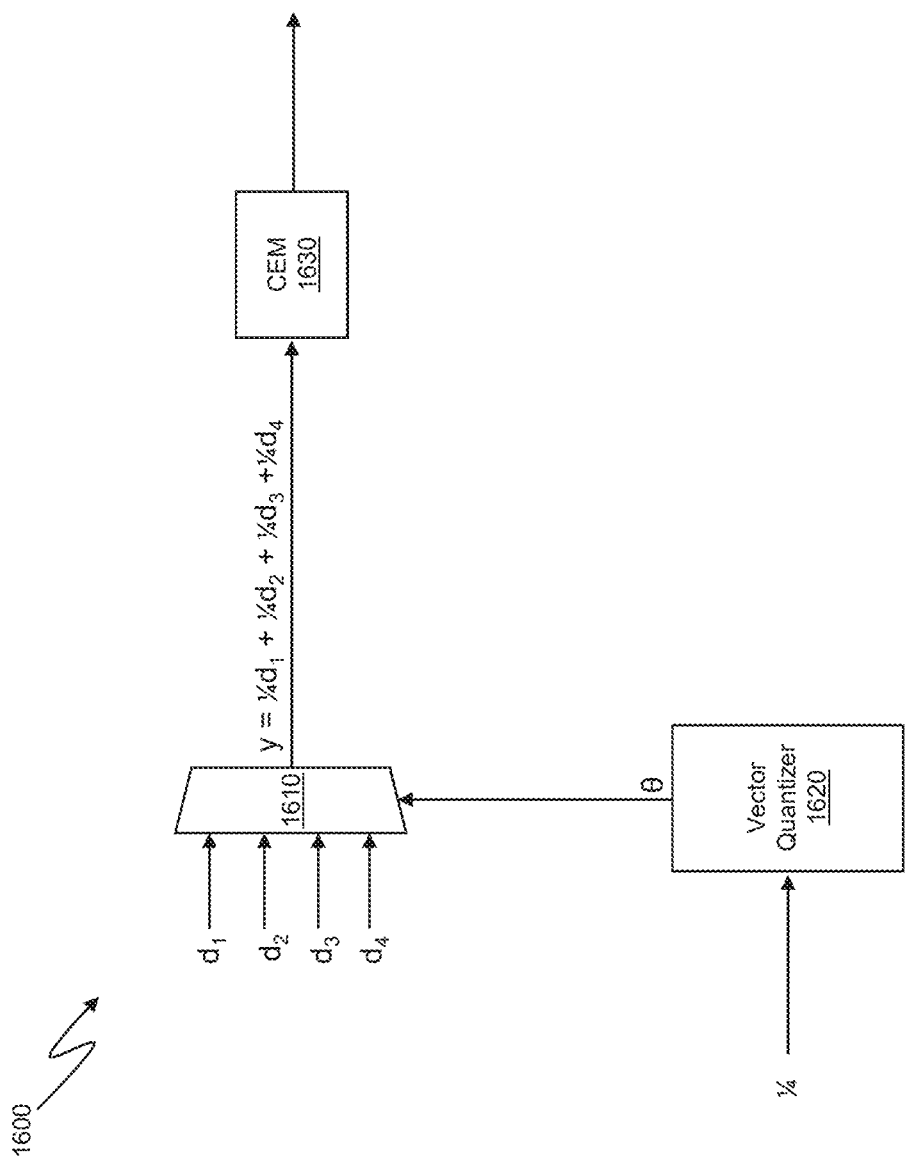
FIG. 16 is a schematic representation of circuitry that may be used to implement a pooling block or layer in circuitry implementing a CNN.

FIG. 16 is a schematic representation of circuitry that may be used to implement a pooling block or layer in circuitry implementing a CNN (e.g. the pooling block 1130 of FIG. 11).

The circuitry, shown generally at 1600 in FIG. 16, is configured to perform mean pooling, and includes multiplexer circuitry 1610, vector quantizer circuitry 1620 and CEM modulator circuitry 1630.

The multiplexer circuitry 1610 is configured to receive a plurality (in this example four) of CEM encoded input signals $d_1$-$d_4$, each output by non-linear function circuitry (e.g. the circuitry 1400 of FIG. 14). A control input of the multiplexer circuitry 1610 is coupled to an output of the vector quantizer circuitry 1620 so as to receive a selector signal θ from the vector quantizer circuitry 1620.

The vector quantizer circuitry 1620 is configured to receive one or more input signals representing a desired weighting to be applied to each of the CEM encoded input signals. In this example, because the circuitry 1600 is configured to perform mean pooling and there are four CEM encoded input signals $d_1$-$d_4$, the input signal represents the value ¼. The selector signal θ output by the vector quantizer circuitry 1620 thus causes the multiplexer circuitry 1610 to select each of the CEM encoded input signals $d_1$-$d_4$ for one quarter of each computation period, such that over a given computation period the output y of the first multiplexer circuitry 1610 is a time division multiplexed signal of the form $$y = \frac{1}{4}d_1 + \frac{1}{4}d_2 + \frac{1}{4}d_3 + \frac{1}{4}d_4.$$

More generally, the selector signal θ output by the vector quantizer circuitry 1620 causes the multiplexer circuitry 1610 to select each of the plurality of CEM encoded input signals for an equal proportion of the computation period. Thus, if there are N input signals to the multiplexer circuitry 1610, then the input signal to the vector quantizer circuitry will represent a value 1/N.

An output of the multiplexer circuitry 1610 is coupled to an input of the CEM modulator circuitry 1630. The CEM modulator circuitry 1630 thus outputs a CEM modulated signal representing the signal y output by the multiplexer circuitry 1610.

As will be appreciated, the present disclosure describes efficient architectures for performing MAC operations using unary coded input signals. Such architectures are particularly suited for use in circuitry implementing a convolutional neural network (CNN).

There are a variety of unary codes that can be used for the input unary coded bitstream signals to the multiplexer circuitry in the circuitry 500, 900, 1000 of the present disclosure. Any unary coding scheme may be used to generate the input bitstream signals, and different unary codes may be used for different ones of the plurality of input unary coded bitstream signals. Examples of suitable unary codes include:

Stochastic codes, which are generated by comparing a random sequence to a reference value to generate a sequence with the correct mean value;

Pseudo-random codes. Here instead of comparing the input to a real random number generator, the comparison is performed between the input and pseudo-random number such as generated from a LFSR (Linear Feedback Shift Register);

Low-Discrepancy codes. These are quasi-random codes that aim to improve on LFSR by converging faster, at the cost of additional complexity required to generate them. Commonly used methods include Halton and Sobol sequences;

Pulse Width Modulation (PWM). Here the data is encoded in the duty cycle of the waveform;

Pulse Density Modulation (PDM). Here the information is encoded in how often the pulses are high. Typically generated via a sigma delta modulator.

Rate coding. This is a neuromorphically inspired method where the pulses are ended by how often they occur. They can be generated via an Integrate and Fire Neuron.

Time encoding modulation. Also known as asynchronous sigma delta modulation. This method encodes the information in the duty cycle, but the duty cycle scales with the amplitude to provide more accuracy.

Consecutive Edge Modulation (CEM). Here the information is encoded in duty cycle, but spread over multiple cycles to minimise the number of edges. Hence it is an optimal method for unary computing since it has a minimum number of edges.

Binary Code modulation (BCM). Here the data is encoded considering each bit of the word to be encoded in turn, producing a number of pulses equal to two the power of its position, with same value as the bit. For example 1 sample of an LSB is sent (which can be high or low), then 2 samples of the next bit, then 4 samples of the next bit, then 8 of the next etc., until the whole value has been encoded. For example, the binary number 1001 would be coded as the sequence 1, then 00, then 0000, then 11111111 i.e. 100000011111111, which has a mean value of 9.

In the examples described above the unary coded bitstreams are described in terms of a unipolar coding scheme in which a value is represented by a stream of bits which can take the value 0 or 1. It will be appreciated by those of ordinary skill in the art that a bipolar coding scheme in which a value is represented by a stream of bits that can take the value −1 or +1, for example.

Embodiments may be implemented as an integrated circuit which in some examples could be a codec or audio DSP or similar. Embodiments may be incorporated in an electronic device, which may for example be a portable device and/or a device operable with battery power. The device could be a communication device such as a mobile telephone or smartphone or similar. The device could be a computing device such as a notebook, laptop or tablet computing device. The device could be a wearable device such as a smartwatch. The device could be a device with voice control or activation functionality such as a smart speaker. In some instances the device could be an accessory device such as a headset, headphones, earphones, earbuds or the like to be used with some other product.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. Circuitry for performing a multiply-accumulate (MAC) operation, the circuitry comprising:
   a first multiplexer having a plurality of inputs for receiving a plurality of unary-coded input signals representing operands of the MAC operation and an output for outputting a multiplexer output signal representing a result of the MAC operation; and
   a first vector quantizer configured to receive a plurality of weighting signals, each representing a proportion of a computation time period for which a respective one of the unary-coded input signals should be selected by the multiplexer and to output a first selector signal to the multiplexer to cause the multiplexer to select each of the input signals in accordance with the plurality of weighting signals;
   wherein the circuitry further comprises an integrator for integrating the multiplexer output signal over a period of time.

2. Circuitry according to claim 1, wherein the circuitry further comprises an encoder for encoding a signal output by the integrator into a unary coded output signal.

3. Circuitry according to claim 1, further comprising a consecutive edge modulator (CEM) configured to encode the multiplexer output signal into a consecutive edge modulated signal.

4. Circuitry according to claim 3, wherein the CEM comprises:
   a first counter configured to generate a first pulse width modulated signal based on a number of high bits in a first frame of the multiplexer output signal;
   a second counter configured to generate a second pulse width modulated signal based on the number of high bits in a second frame of the multiplexer output signal;
   a selector configured to select the first pulse width modulated signal as a first frame of a CEM output signal and to invert the second pulse width modulated signal in time to generate a second frame of the CEM output signal.

5. Circuitry according to claim 4, wherein the second frame of the multiplexer output signal immediately follows the first frame of the multiplexer output signal, and wherein the second frame of the CEM output signal immediately follows the first frame of the CEM output signal.

6. Circuitry according to claim 4, wherein the first frame of the multiplexer output signal is an odd-numbered frame of the multiplexer output signal and the second frame of the multiplexer output signal is an even-numbered frame of the multiplexer output signal.

7. Circuitry according to claim 1, wherein the first vector quantizer comprises:
   a plurality of integrators, each configured to receive a respective weighting signal; and
   a processing unit configured to, in each cycle of a computation period of the circuitry:
      determine a maximum among the outputs of the plurality of integrators;
      output a control signal to the first multiplexer to cause the first multiplexer to select an input corresponding to the weighting signal received by the integrator whose output is maximum; and
      reset the integrator whose output is maximum.

8. Circuitry according to claim 7, wherein resetting the integrator comprises resetting the output of the integrator to 0 or to a random value.

9. Circuitry according to claim 1, wherein the first vector quantizer comprises a tree-based modulator.

10. Circuitry according to claim 1, further comprising a second multiplexer configured to receive a second selector signal from the first vector quantizer.

11. Circuitry according to claim 1, further comprising a second multiplexer and a second vector quantizer, the second multiplexer being configured to receive a second selector signal from the second vector quantizer.

12. Circuitry according to claim 1, wherein each of the plurality of unary-coded input signals is encoded according to a common encoding scheme.

13. Circuitry according to claim 1, wherein at least one of the plurality of unary-encoded input signals is encoded according to a different encoding scheme than at least one other of the plurality of unary-encoded input signals.

14. Convolutional Neural Network (CNN) circuitry comprising MAC circuitry according to claim 1.

15. An integrated circuit comprising the circuitry of claim 1.

16. A device comprising the circuitry of claim 1.

17. A device according to claim 16, wherein the device comprises a portable device, a battery powered device, a mobile telephone, a tablet or laptop computer, a smart speaker, an accessory device, a headset device, smart glasses, headphones, earphones or earbuds.

18. Stochastic to consecutive edge modulation (CEM) converter circuitry comprising:

a first counter configured to generate a first pulse width modulated signal based on a number of high bits in a first frame of a received stochastic signal;

a second counter configured to generate a second pulse width modulated signal based on the number of high bits in a second frame of the received stochastic signal; and a selector configured to select the first pulse width modulated signal as a first frame of a CEM output signal and to invert the second pulse width modulated signal in time to generate a second frame of the CEM output signal.

19. Circuitry for performing a multiply-accumulate (MAC) operation, the circuitry comprising multiplexer circuitry configured to output a time division multiplexed output signal comprising portions of a plurality of unary coded multiplexer input signals selected according to a control signal received by the multiplexer circuitry from vector quantizer circuitry;

wherein the first vector quantizer comprises a tree-based modulator; or wherein the first vector quantizer comprises:
   a plurality of integrators, each configured to receive a respective weighting signal; and
   a processing unit configured to, in each cycle of a computation period of the circuitry:
      determine a maximum among the outputs of the plurality of integrators;
      output a control signal to the first multiplexer to cause the first multiplexer to select an input corresponding to the weighting signal received by the integrator whose output is maximum; and
      reset the integrator whose output is maximum.

20. A device comprising circuitry for performing a multiply-accumulate (MAC) operation, the circuitry comprising:

a first multiplexer having a plurality of inputs for receiving a plurality of unary-coded input signals representing operands of the MAC operation and an output for outputting a multiplexer output signal representing a result of the MAC operation; and a first vector quantizer configured to receive a plurality of weighting signals, each representing a proportion of a computation time period for which a respective one of the unary-coded input signals should be selected by the multiplexer and to output a first selector signal to the multiplexer to cause the multiplexer to select each of the input signals in accordance with the plurality of weighting signals;

wherein the device comprises a portable device, a battery powered device, a mobile telephone, a tablet or laptop computer, a smart speaker, an accessory device, a headset device, smart glasses, headphones, earphones or earbuds.

* * * * *